United States Patent
Yoshimura

(10) Patent No.: US 7,505,047 B2
(45) Date of Patent: Mar. 17, 2009

(54) VEHICLE PERIPHERY VIEWING APPARATUS

(75) Inventor: Akinobu Yoshimura, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 353 days.

(21) Appl. No.: 11/110,791

(22) Filed: Apr. 21, 2005

(65) Prior Publication Data

US 2005/0249379 A1    Nov. 10, 2005

(30) Foreign Application Priority Data

Apr. 23, 2004    (JP)    ............... 2004-128419

(51) Int. Cl.
  *G09G 5/00*    (2006.01)
(52) U.S. Cl. .................. 345/620; 345/660; 345/667
(58) Field of Classification Search .......... 345/620, 345/660, 667
  See application file for complete search history.

(56) References Cited

U.S. PATENT DOCUMENTS

| | | | |
|---|---|---|---|
| 5,670,935 A * | 9/1997 | Schofield et al. ............ 340/461 |
| 6,476,855 B1 * | 11/2002 | Yamamoto .................. 348/148 |
| 6,498,620 B2 * | 12/2002 | Schofield et al. ............ 348/148 |
| 6,515,597 B1 * | 2/2003 | Wada et al. .................. 340/988 |
| 6,765,607 B2 | 7/2004 | Mizusawa et al. |
| 6,993,159 B1 * | 1/2006 | Ishii et al. ................... 382/104 |
| 7,110,021 B2 * | 9/2006 | Nobori et al. ............... 348/148 |
| 7,245,275 B2 | 7/2007 | Okada et al. |
| 7,256,688 B2 | 8/2007 | Mizusawa |
| 2002/0145662 A1 | 10/2002 | Mizusawa et al. |

FOREIGN PATENT DOCUMENTS

| | | |
|---|---|---|
| CN | 1373720 A | 10/2002 |
| EP | 1 249 365 A1 | 10/2002 |
| JP | A-2003-104145 | 4/2003 |
| JP | A-2003-255925 | 9/2003 |

* cited by examiner

*Primary Examiner*—M Good Johnson
(74) *Attorney, Agent, or Firm*—Oliff & Berridge, PLC

(57) ABSTRACT

A vehicle periphery viewing apparatus for capturing a vehicle-peripheral image includes: an image capturing device disposed on predetermined position; a display device disposed within the vehicle; and an image processing device performing an image division of the original image into a first image and a second image. The image capturing device captures an original image from the predetermined position. The display device displays the captured vehicle-peripheral image. The image processing device performs a coordinate conversion into a plan view coordinate by using a geometrical correction for the first image. The image processing device performs a predetermined image synthesis for the first image and the second image. The image processing device displays a synthesized image on the display device.

11 Claims, 6 Drawing Sheets

VEHICLE PERIPHERY VIEWING APPARATUS

BACKGROUND OF THE INVENTION

1. Field of the Invention

The present invention relates to a vehicle periphery viewing apparatus for capturing images in the periphery of a vehicle with an image capturing device and displaying the sensed images on a display device in the vehicle.

2. Description of the Related Art

In the field of vehicles, for example, in order to facilitate a driver to see an area behind a vehicle, the area is captured by a back camera installed in the rear of the vehicle and the captured area is displayed on a display device such as a liquid crystal panel installed in the vehicle.

Requirements for such a back camera can include the following two points.

(1) Seeing walkers, obstacles and so on in the periphery of a vehicle using a camera image.

(2) Grasping the sense of distance between a vehicle and another vehicle or an obstacle such as a wall with a resolution of 10 cm, for example, when the vehicle reverses.

Of both points, point (1) can be achieved by using a typical original image of the back camera. FIG. 8 shows an original image captured by the back camera. As can be seen from the original image, since a back camera 1 is installed at a height H from the ground level, as shown in FIG. 9, the original image which falls within a visual field range 3 of the back camera 1 is captured at a point of view from which an object is obliquely seen downward.

Regarding point (2), for example, as shown in FIG. 10, it is possible to grasp the sense of distance by transforming an image at the point of view from which an object is obliquely seen downward into an image of a plan view coordinate using a view point conversion technique such as a geometrical correction for an image.

SUMMARY OF THE INVENTION

With the original image at the point of view from which the object is obliquely seen downward, as shown in FIG. 8, since the installation height of the back camera 1 is typically different from the view height of a viewer, it is not always easy for the viewer to recognize surrounding images.

From this point of view, as shown in FIG. 10, the image of the plan view coordinate obtained by the view point conversion has an advantage of an easy grasp of the distance between a peripheral obstacle and a vehicle.

However, the view point conversion technique using the geometrical correction is performed based on a plane in parallel to the ground, and therefore, cannot correctly represent an object having a height. Referring to FIG. 11, for example, in the case where an object 7 having an actual height lies on the ground 5 and its actual existence range is viewed narrower in a plan view, when the object 7 is obliquely captured at a point of view from which the back camera 1 obliquely looks down at the object 7 and the view point conversion is performed for an image including the object 7 using the geometrical correction, the actual existence range of the object 7 is expanded to an area L1 in the plan view coordinate. Then, when the image converted in the plan view coordinate is displayed on the display device, the object 7 is shown as if the height is more than the actual height.

For example, when an object 7a shown in FIG. 8 has a height A1, it is displayed as an image having a height A2 (see FIG. 12) which is more than height A1 in FIG. 11. In addition, when the view point conversion into the plan view coordinate by using the geometrical correction is performed for the image, a farther image has a more extent of distance conversion and, as it becomes far off in the distance, there is a high possibility that the ground is not captured and the object 7a having the height is captured. Accordingly, when the view point conversion is performed in the plan view coordinate for all images within a capturing range using the geometrical correction, for example, trees 7b existing behind the object 7a shown in FIG. 8 is displayed as distorted images such that it is impossible to know what is imaged, as shown by reference numeral 7b in FIGS. 12 and 13.

In other words, the image for which the view point conversion into the plan view coordinate by using the geometrical correction is performed is effective within a relatively short distance range from the back camera 1, but images beyond a certain distance are so significantly distorted that it is difficult to view. In addition, as shown in FIGS. 12 and 13, the visibility greatly deteriorates because the short distance area becomes small in the images after the view point conversion into the plan view coordinate. Thus, the long distance area having an insufficient resolution of original pixels is expanded.

In this manner, when the view point conversion by the geometrical correction is performed, images of obstacles having a height are distorted, which a driver cannot ascertain the distance between the vehicle and the object, making it unsafe.

Therefore, it can be considered that images for the entire captured range are not displayed on the display device, but only a short distance area is extracted and displayed on the display device.

However, in this case, since only a portion of the images captured by the back camera 1 is displayed, the back camera 1 is inefficiently used. In addition, even when a relatively short distance area is displayed on the display device, as shown in FIG. 10, the distortion of the image of the object 7a is unavoidable, thus making the deterioration of the visibility also unavoidable.

It is therefore an object of the present invention to provide a vehicle periphery viewing apparatus capable of sensibly grasping a straightly positional relationship up to an obstacle while mitigating inconsistency of a long distance area when a coordinate conversion into a plan view coordinate by a geometrical correction is performed.

According to a first aspect of the invention, a vehicle periphery viewing apparatus includes: an image capturing device disposed on predetermined position; a display device disposed within the vehicle; and an image processing device performing an image division of the original image into a first image and a second image. The image capturing device captures an original image from the predetermined position. The display device displays the captured vehicle-peripheral image. The image processing device performs a coordinate conversion into a plan view coordinate by using a geometrical correction for the first image. The image processing device performs a predetermined image synthesis for the first image and the second image. The image processing device displays an synthesized image on the display device.

By thus configuration, when a wide view angle camera, for example, is used as the image capturing device, if an object having a height, which is not the ground-level, is seen in the long distance image, the coordinate conversion into the plan view coordinate by the geometrical correction is performed for a captured image of the object. Consequently, the displayed image is distorted, thus increasing inconsistency due to a deformed appearance of the object. However, with the vehicle periphery viewing apparatus according to the first aspect of the invention, the original image is divided into a short distance image and a long distance image is performed, a coordinate conversion into a plan view coordinate by using a geometrical correction for the short distance image is performed. An image synthesis for the short distance image and the long distance image is performed such that the short distance image and the long distance image are vertically arranged at a point of view from which the object is obliquely seen downward, and the synthesized short and long distance images are displayed on the display device. Therefore, it can prevent the distorted image from being displayed into the long distance image as in the conventional examples, in which the view point conversion into the plan view coordinate is performed for the entire screen image. Accordingly, such the distorted appearance of the object shown in the long distance image can be prevented and thus, such inconsistency can be eliminated.

According to a second aspect of the invention, in the vehicle periphery viewing apparatus according to the first aspect, the image processing device performs a coordinate conversion and/or a scale change for the short distance image and/or the long distance image such that no inconsistency occurs at a boundary between the vertically arranged short and long distance images.

By thus configuration, a coordinate conversion and/or a scale change for the short distance image and/or the long distance image is performed such that no inconsistency occurs at a boundary between the vertically arranged short and long distance images. Therefore, a seam between images displayed at both sides of the boundary can be naturally displayed. Accordingly, a visible image can be displayed on the display device.

According to third aspect of the invention, the image processing device performs image processing such that a view point conversion image of the short distance image is enlarged and an image range, which is enlarged in the short distance image and is not included in a range of angle of view, is included in the long distance image.

By thus configuration, image processing is performed such that a view point conversion image of the short distance image is enlarged and an image range, which is enlarged in the short distance image and is not included in a range of angle of view, is included in the long distance image. Therefore, an image within a range of angle of view reduced by the enlargement display of the short distance image can be added to the long distance image. Accordingly, a visible image can be displayed on the display device.

According to a fourth aspect of the invention, the short distance image is set to a range required for making the vehicle approach a target stop position from a predetermined position immediately before its stop.

By thus configuration, the short distance image is set to a range required for making the vehicle approach a target stop position from a predetermined position immediately before its stop. Therefore, a user can easily ascertain his safety.

According to a fifth aspect of the invention, the image processing device performs the image synthesis after arranging an area in which an image is not displayed between the short distance image and the long distance image.

Since the image processing device performs the image synthesis after arranging an area in which an image is not displayed between the short distance image and the long distance image. Therefore, the user can intuitively distinguish between image processes performed in both images and between methods of displaying both images.

According to a sixth aspect of the invention, the image processing device switches between a first mode for making a scale range at the boundary between the short distance image and the long distance image equal and a second mode for enlarging the short distance image.

By thus configuration, the image processing device switches between a first mode for making a scale range at the boundary between the short distance image and the long distance image equal and a second mode for enlarging the short distance image. Therefore, a convenience may be given to the user in that images without any inconsistency can be displayed on the display device in the first mode, while the sense of distance up to other vehicle or an obstacle such as a wall shown in the enlarged short distance image can be sensibly grasped in the second mode.

According to a seventh aspect of the invention, the image processing device switches between the first mode and the second mode according to vehicle conditions obtained over an in-vehicle communication network and/or operation of an operational input device.

According to an eighth aspect of the invention, in the vehicle periphery viewing apparatus according to the sixth or seventh aspect, the image processing device switches between the first mode and the second mode by performing a coordinate conversion using one table selected from a plurality of preset conversion tables.

By thus configuration, the image processing device switches between the first mode and the second mode according to vehicle conditions obtained over an in-vehicle communication network and/or operation of an operational input device. Therefore, a convenience may be given to the user in that switchover between the first mode and second mode is performed automatically or by a user's desire.

According to a ninth aspect of the invention, the image processing device switches between the first mode and the second mode by storing all of a plurality of conversion tables pre-stored in a nonvolatile memory in a conversion table memory and performing the coordinate conversion using one table selected from the conversion table memory.

By thus configuration, the image processing device switches between the first mode and the second mode by storing all of a plurality of conversion tables pre-stored in a nonvolatile memory in a conversion table memory and performing the coordinate conversion using one table selected from the conversion table memory. Therefore, an optimal conversion table can be easily applied in compliance with changes of the vehicle conditions.

According to a tenth aspect of the invention, the image processing device performs an image synthesis for the long distance image after enlarging or reducing the long distance image without changing the long distance image included in the original image.

By thus configuration, the image processing device performs an image synthesis for the long distance image after enlarging or reducing the long distance image without changing the long distance image included in the original image. Therefore, the long distance image can be easily processed, and thus, simplification of internal configuration and software programs within the image processing device, as well as efficient image processing of the long distance image, can be achieved.

DESCRIPTION OF THE EMBODIMENT

<Configuration>

Figure 1:
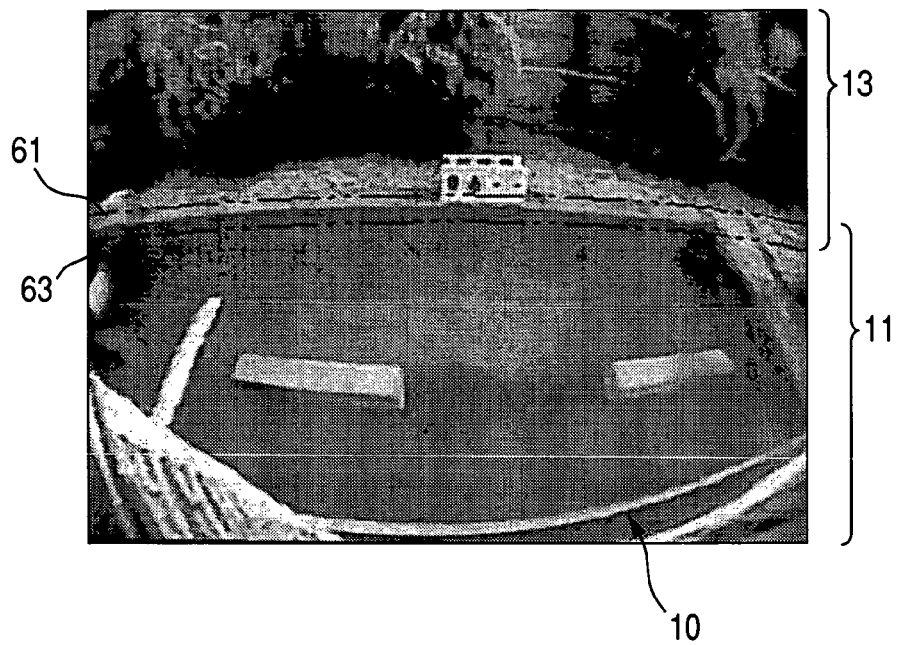
FIG. 1 is a view showing an original image captured by a camera of a vehicle periphery viewing apparatus according to an embodiment of the present invention.
Figure 2:
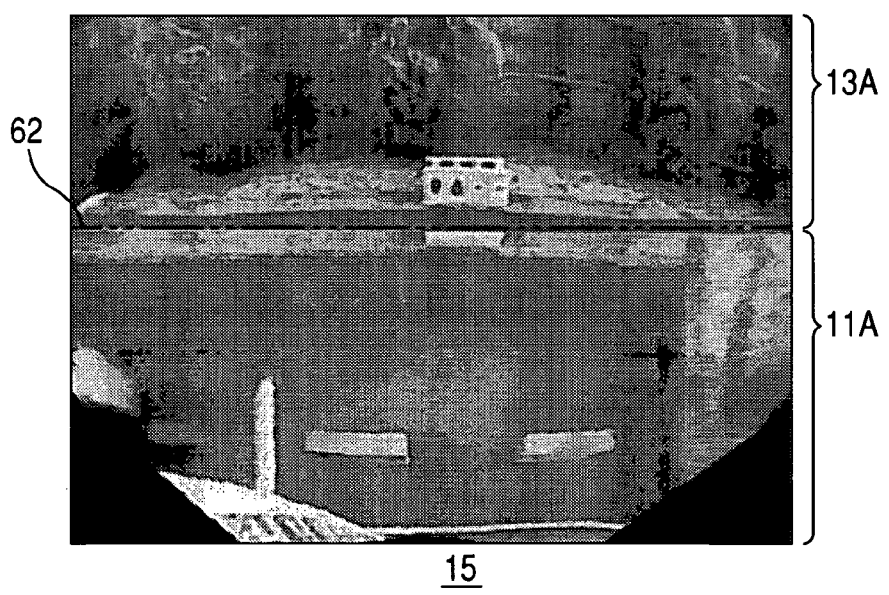
FIG. 2 is view showing an example of a display in a first mode for the vehicle periphery viewing apparatus according to the embodiment of the present invention.
Figure 3:
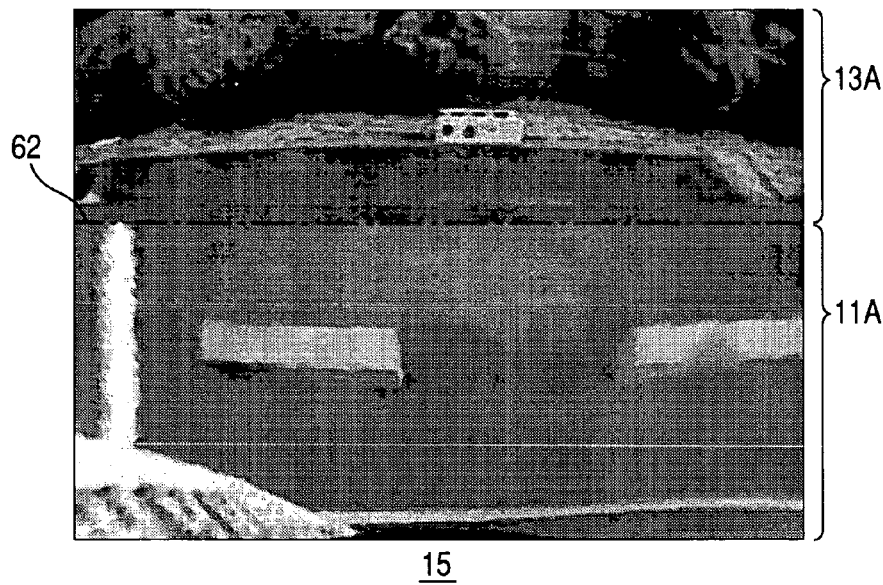
FIG. 3 is view showing an example of display in a second mode for the vehicle periphery viewing apparatus according to the embodiment of the present invention.

FIG. 1 is a view showing an example of an original image captured by a camera of a vehicle periphery viewing apparatus according to an embodiment of the present invention, FIGS. 2 and 3 are views showing an example of a display in the vehicle periphery viewing apparatus according to the embodiment of the present invention. In this embodiment, elements having the same function as the conventional vehicle periphery viewing apparatus shown in FIG. 9 are denoted by the same reference numerals.

Figure 9:
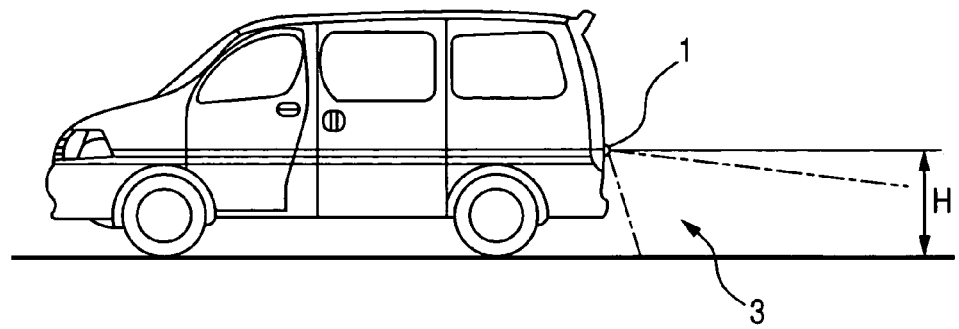
FIG. 9 is a diagram illustrating an example of installation position of a camera in a vehicle.

In order for a driver (user) in a vehicle to ascertain peripheral safety, the vehicle periphery viewing apparatus photographs an original image 10 for periphery including an area behind the vehicle, as shown in FIG. 1, at a point of view from which an object is obliquely seen downward as shown in FIG. 9. The vehicle periphery viewing apparatus sets an image 11 within a short distance range (hereinafter, referred to as a 'short distance image') corresponding to a lower portion of the original image 10 and an image 13 within a long distance range (hereinafter, referred to as a 'long distance image') corresponding to an upper portion of the original image 10. The vehicle periphery viewing apparatus performs a view point conversion into a plan view coordinate by a geometrical correction for the short distance image 11 while performing a coordinate conversion for the long distance image 13 such that the long distance image 13 corresponds to an boundary portion between the long distance image 13 and the geometrically corrected short distance image 11 at the point of view from which an object is obliquely seen downward, as shown in FIGS. 2 and 3. the vehicle periphery viewing apparatus fits these short and long distance images 11 and 13 into preset areas 11A and 13A of a display device (display device) 15 (FIG. 4), respectively, and displays them on the display device 15.

Figure 4:
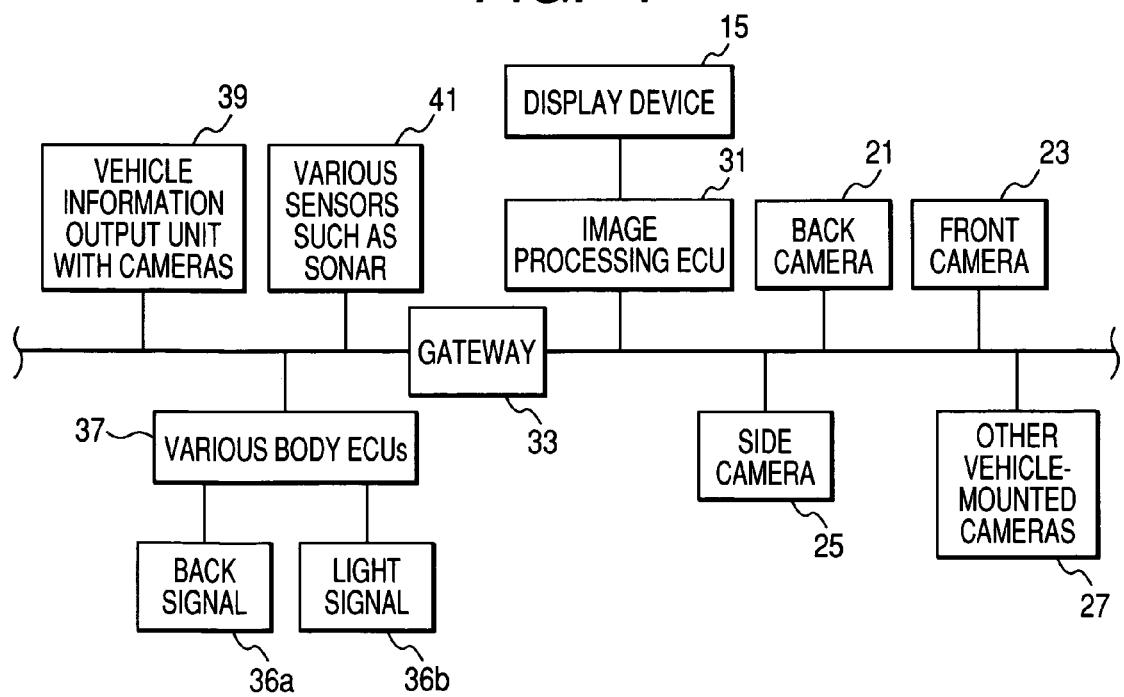
FIG. 4 is a block diagram illustrating the vehicle periphery viewing apparatus according to the embodiment of the present invention.

In more detail, in the vehicle periphery viewing apparatus, as shown in FIG. 4, a back camera 21, a front camera 23, a side camera 25, and other vehicle-mounted cameras 27 are connected to a vehicle-mounted LAN 29 as an image transmission path, images captured by these cameras (image capturing device) 21, 23, 25, and 27 are received in an image processing ECU (image processing device) 31 via the vehicle-mounted LAN 29, and the received images are processed in the image processing ECU 31 for display on the display device 15.

In addition, as shown in FIG. 4, the vehicle-mounted LAN 29 is connected to another vehicle-mounted LAN (an in-vehicle communication network) 35 via a gateway 33. Various body ECUs 37 for transmitting/receiving a back signal 36a and a light signal 36b, a vehicle information output unit 39 to which the cameras 21, 23, 25, and 27 are mounted, and various sensors 41 including a vehicle speed sensor, a steering sensor, a sonar and vehicle information are connected to the vehicle-mounted LAN 35.

Here, the cameras 21, 23, 25 and 27 are typical cameras including an image sensing devices such as a CCD. For example, as described above, the back camera 21 photographs the original image 10 as shown in FIG. 1 at the point of view from which the object is obliquely seen downward, as shown in FIG. 9. The original image 10 captured by the back camera 21 is transmitted to the image processing ECU 31 via the vehicle-mounted LAN 29.

Figure 5:
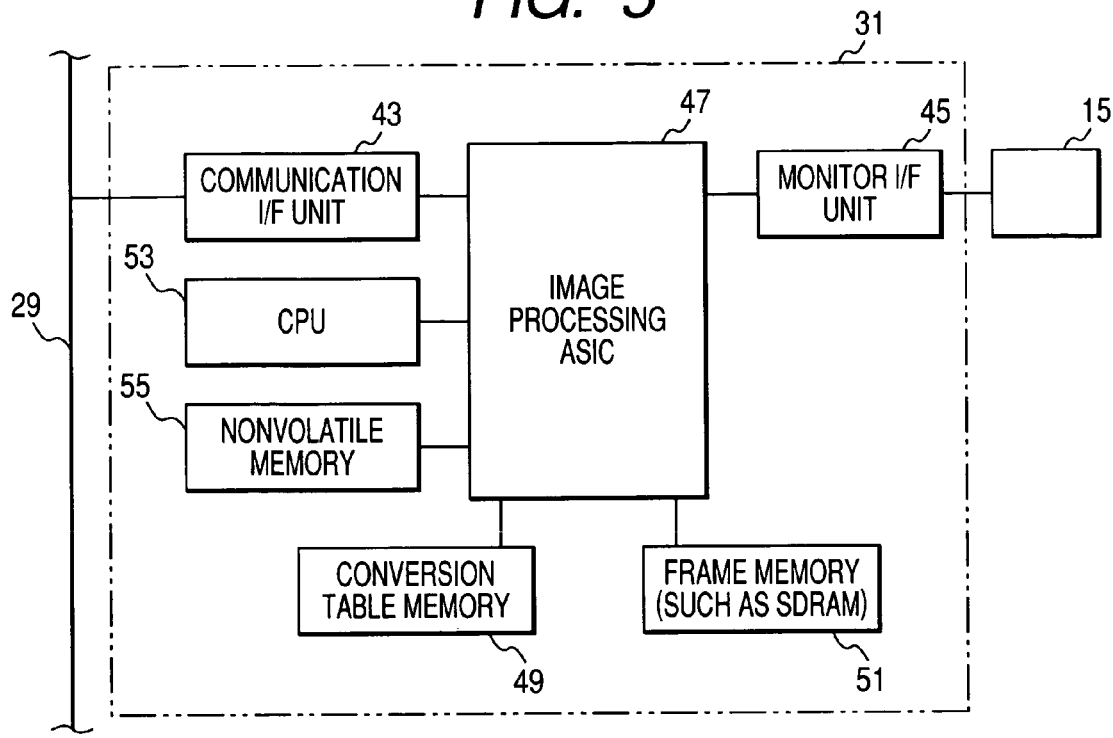
FIG. 5 is a block diagram illustrating an internal configuration of an image processing ECU of the vehicle periphery viewing apparatus according to the embodiment of the present invention.

As shown in FIG. 5, the image processing ECU 31 includes a communication I/F unit 43 as a communication interface for performing communication with the vehicle-mounted LAN 29, a monitor I/F unit 45 connected to the display device 15, an image processing ASIC 47 for processing the image, a conversion table memory 49 for storing a conversion table for performing a coordinate conversion in the image processing ASIC 47, a frame memory 51 such as an SDRAM for temporarily storing the image when the image is processed in the image processing ASIC 47, a CPU 53 for controlling the image processing ASIC 47, and a writable nonvolatile memory 55 for providing various parameters for the image processing in the image processing ASIC 47.

Here, the frame memory 51 can store data having capacity larger than data per frame of the original image 10.

In addition, the image processing ASIC 47 performs different kinds of image processing depending on to a first mode as shown in FIG. 2 and a second mode as shown in FIG. 3.

In the first mode as shown in FIG. 2, first, the short distance image 11 and the long distance image 13 as shown in FIG. 1 are stored in the frame memory 51.

Here, the short distance image 11 is referred to as an image set to a range required for making a vehicle approach to a target stop position from a predetermined position of several meters or so. The short distance image 11 is set in advance based on the driver's (user) discretion.

Further, the long distance image is a constant image range, which extends to a distance longer than the short distance image 11, in the image captured by the back camera 21. In addition, in the example of FIG. 1, although boundaries 61 and 63 are set such that the short distance image 11 partially overlaps the long distance image 13, a range in which the short distance image 11 and the long distance image 13 is connected to each other may be set such that portions of the image ranges do not overlap each other.

Also, the view point conversion into the plan view coordinate by the geometrical correction is performed for the short distance image 11. In addition, a predefined coordinate conversion is performed for the long distance image 13 such that the short distance image 11 corresponds to the long distance image 13 in their relative positions when the long distance image 13 is displayed on the display device 15 above and below the short distance image 11.

More specifically, an upper end line 61 of the short distance image 11 of the original image 10 is curved more to an upper side at a position closer to a middle portion of the upper end line 61. The upper end line 61 is transformed into a straight line 62 (FIG. 2) when the upper end line 61 is coordinate-converted by the image processing ASIC 47 for the view point conversion into the plan view coordinate. Then, in correspondence to a coordinate conversion of the upper end line 61 of the short distance image 11 from the curved line into a straight line in a screen height direction, a coordinate conversion is performed for a lower end line 63 (FIG. 1) of the long distance image 13 such that the lower end line 63 is transformed from the curved line into the straight line 62. However, unlike the coordinate conversion of the short distance image 11 into the plan view coordinate, in the coordinate conversion of the long distance image 13, for example, an average image magnification in a longitudinal direction (i.e., a backward direction and a height direction) is set to be approximately equal to an average image magnification in a transverse direction (i.e., a vehicle width direction) without performing equal image enlargement (scale change) in the height direction. More specifically, an image magnification of a portion in a vertical direction illuminated at a relatively long distance becomes larger than an image magnification, in a vertical direction, of a portion illuminated at a relatively short distance in the short distance image 11. However, in the long distance image 13, an image magnification, in a vertical direction, of a portion illuminated at a relatively long distance is approximately equal to an image magnification in a vertical direction of a portion illuminated at a relatively short distance. In addition, in the long distance image 13, by performing a range adjustment in the transverse direction with the short distance image 11, seams of images displayed above and below the boundary 62 are naturally displayed. In addition, in the long distance image 13, as described above, since the boundary with the short distance image 11 is transformed from the curved line 63 (FIG. 1) into the straight line 62 (FIG. 2), each portion in the long distance image 13 after the coordinate conversion has a small distortion as compared to the original image 10 and is coordinate-converted such that it is maintained as analogous as possible to the original image 10.

The image processing ASIC 47 reads data (conversion table and so on) stored in the conversion table memory 49 and performs the coordinate conversion for these short distance image 11 and long distance image 13 temporarily stored in the frame memory 51, based on the read data. Then, the image processing ASIC 47 positions the short distance image 11 after the coordinate conversion in an area 11A at a relatively lower portion of each frame of the image and positions the long distance image 13 after the coordinate conversion in an area 13A at a relatively upper portion of each frame of the image, as shown in FIG. 2, performs a synthesis of the images, and outputs the synthesized images in units of frame.

On the other hand, the second mode as shown in FIG. 3 is similar to the first mode except that the coordinate-converted short distance image 11 is enlarged (scale change), positioned in the lower area 11A of each frame of the image, and outputted to the display device 15. A magnification of the short distance image 11 in the second mode is preset such that the sense of distance up to a different vehicle or an obstacle such as a wall shown in the short distance image 11 can be sensibly grasped in units of 10 cm or so, for example, when the driver (user) reverses the vehicle while watching the screen of the display device 15. In addition, the long distance image 13 in the second mode is equal to the image displayed in the first mode, and an enlargement (scale change) display of the long distance image 13 in correspondence to the enlarged (scale change) short distance image 11 is not performed. Accordingly, although the second mode is equal to the first mode in that the long distance image 13 is displayed at the point of view from which the object is obliquely seen downward, since image magnifications of both the images 11 and 13 at the boundary between the long distance image 11 and the short distance image 62 are different from each other, both images are not displayed with connection between them. Accordingly, it is apparent that the short distance image 11 is enlarged (scale change) and displayed.

In the second mode, preferably, since a range of an angle of view in which the short distance image 11 is displayed in the area 11A of the display device 15 is decreased by the enlargement display (scale change) of the short distance image 11, an image is added to the long distance image 13 by the amount of decrease. Therefore, the long distance image 13 is displayed with a reduction (scale change) in a vertical direction (13A in FIG. 3). In this case, it makes no difference that an average image magnification in the longitudinal direction (i.e., the backward direction and the height direction) in the long distance image 13 is not significantly equal to an average image magnification in the transverse direction (i.e., the vehicle width direction).

In addition, the boundary 62 between the upper and lower images can be vertically moved in each mode (the first and second modes) using an operational input device of an electronic unit such as a car navigator. Accordingly, when the user actually views the image shown in FIG. 2 or 3, the operator can freely adjust the position of the boundary 62 so that the operator facilitates a sensible grasp of the image. The adjusted position of the boundary 62 is recorded in the writable nonvolatile memory 55 and reappears initially when the vehicle periphery viewing apparatus starts next time.

Here, the image processing ECU 31 reads all of a plurality of conversion tables pre-stored in the nonvolatile memory 55. ECU 31 stores them in the conversion table memory 49. ECU 31 receives image signals transmitted from the cameras 21, 23, 25 and 27 as well as various kinds of information transmitted via the vehicle-mounted LAN 35, including vehicle speed sensor information, the steering sensor information, sonar and vehicle information transmitted from the various sensors 41, ECU 31 determines whether or not the vehicle satisfies predetermined conditions. For example, ECU 31 determines whether the vehicle speed sensor senses a vehicle reversing speed below a specific speed and the sonar sensor senses an obstacle behind the vehicle, in the CPU 53 based on the above-mentioned information. ECU 31 reads the conversion table for coordinate conversion corresponding to the conditions from the conversion table memory (SDRAM and so on) 49 for each of the short distance image 11 and the long distance image 13 based on a determination result. ECU 31 finds an address of a moving destination of an image read from the back camera 21 by referring to the read conversion table and moving the short distance image 11 and the long distance image 13, read from the back camera 21, to the address. ECU 31 performs a screen division while performing the image processing such as the coordinate conversion for each of the short distance image 11 and the long distance image 13, using the various functions.

In addition, switchover between the first mode and the second mode in the image processing ECU 31 may be performed by, for example, operation of any operational input device (not shown) such as a touch sensor or a push button switch. However, it is preferable that the switchover is automatically performed when any sensing signal is transmitted from the various sensors 41 such as the sonar connected to the vehicle-mounted LAN 35. For example, when the first mode is initially selected, a switchover from the first mode to the second mode is automatically performed when the vehicle speed sensor senses a vehicle reversing speed below a specific speed and the sonar sensor senses an obstacle behind the vehicle.

In addition, a plurality of the conversion tables used for the coordinate conversion is prepared for each mode and is selectively used based on a signal from the operational input device (not shown) when the operational input device is operated by the user.

In addition, a monitor device such as a car navigation system also serves as the display device 15.

<Operation>

Figure 6:
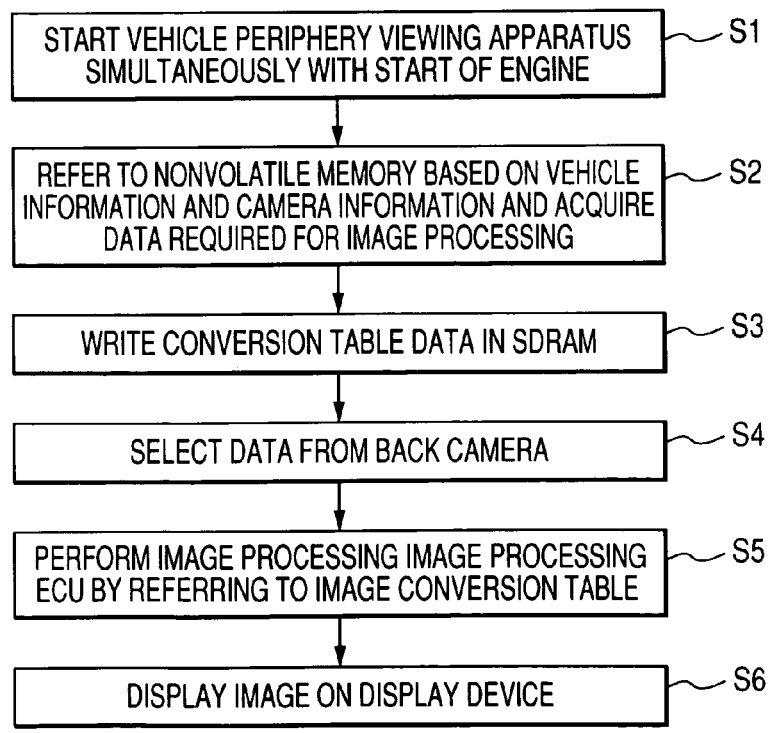
FIG. 6 is a flow chart illustrating the operation of the vehicle periphery viewing apparatus according to the embodiment of the present invention.
Figure 7:
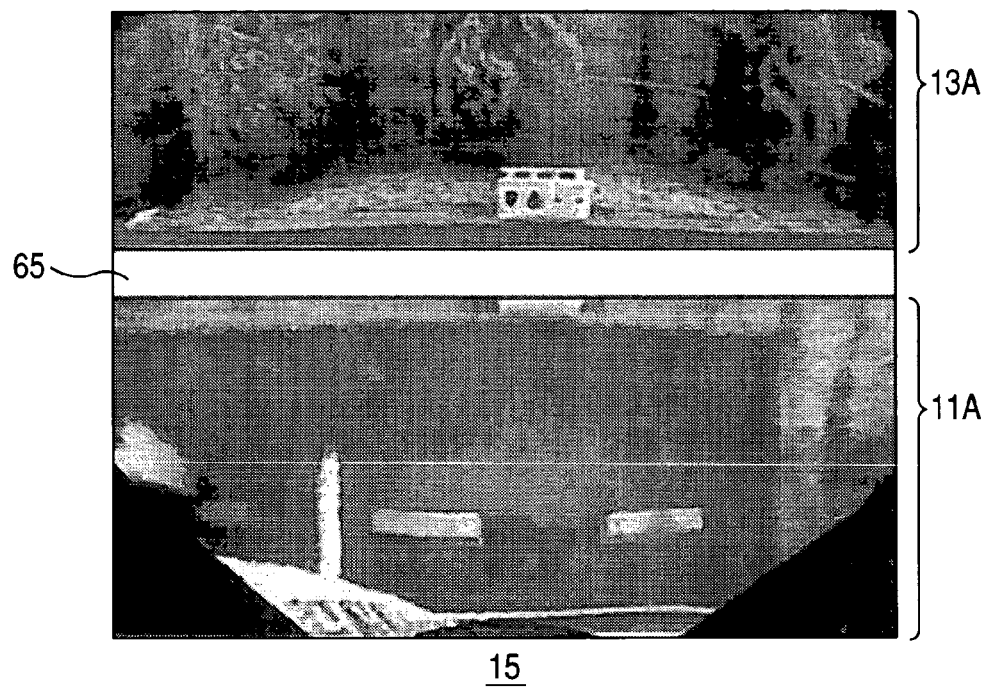
FIG. 7 is a view showing an example of a display of a modification of the vehicle periphery viewing apparatus according to the embodiment of the present invention.
Figure 8:
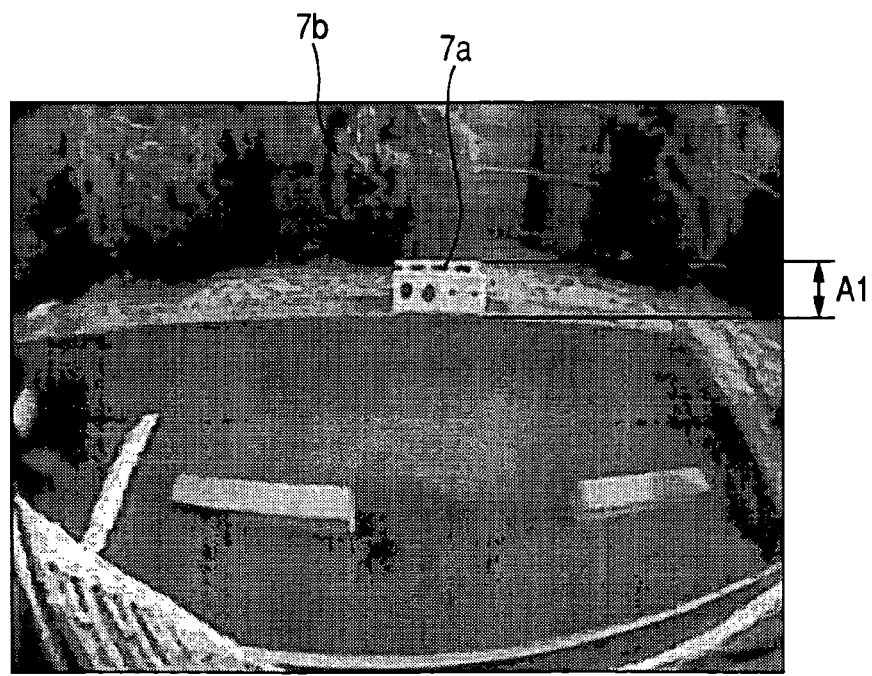
FIG. 8 is a view showing an original image captured by a camera.

An example of the operation of the vehicle periphery viewing apparatus as configured above will be described with reference to a flow chart of FIG. 6. First, in Step S1 in the flow chart of FIG. 6, simultaneously with the start of an engine, the vehicle periphery viewing apparatus is powered on and starts.

Next, in Step S2, when information is transmitted from the various sensors 41, vehicle conditions are determined based on the information. For example, based on a determination result on whether the vehicle speed sensor senses a vehicle reversing speed below a specific speed and the sonar sensor senses an obstacle behind the vehicle, it is determined whether or not an enlargement (scale change) image is required as the short distance image 11 (i.e., whether a required mode is the first mode or the second mode). Alternatively, either of the first mode and the second mode may be selected by the operation of the operational input device (not shown) by the user.

Simultaneously, the plurality of conversion tables is all read from the nonvolatile memory 55, and then, is temporarily stored in the conversion table memory 49 (SDRAM and so on) in Step S3.

Next, in Step S4, an image from the back camera 21 is selected according to the vehicle conditions determined in Step S2. In Step S5, the image processing ECU 31 finds an address of a moving destination of the image read from the back camera 21 by referring to ones, suitable to the vehicle conditions, of data (conversion tables and so on) stored in the conversion table memory 49 and moves the short distance image 11 and the long distance image 13 read from the back camera 21 to the address. In this manner, a screen division is performed while the image processing such as the coordinate conversion is performed for each of the short distance image 11 and the long distance image 13.

Thereafter, an image signal for each frame from the image processing ECU 31 is outputted to the monitor I/F unit 45, and then, in Step S6, the image is displayed on the display device 15 via the monitor I/F unit 45.

Figure 10:
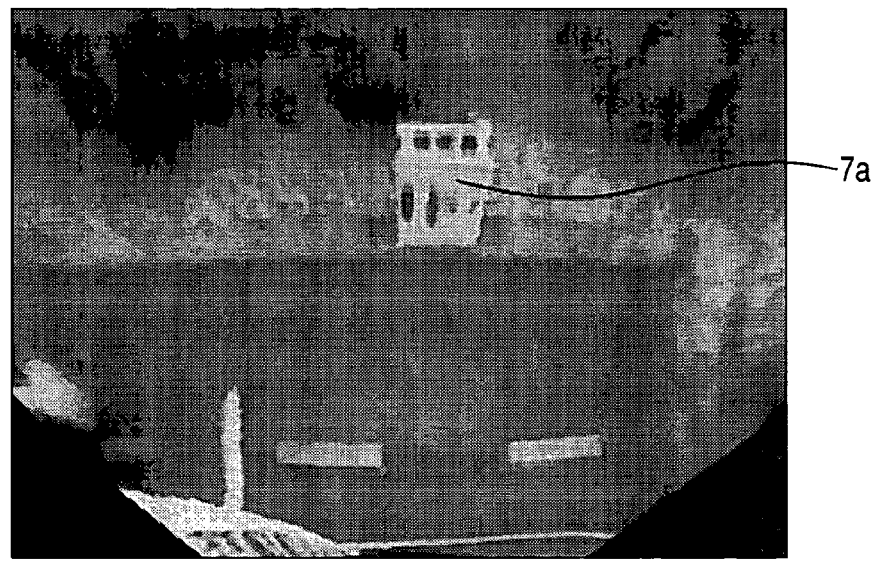
FIG. 10 is a view showing an example of image for which a coordinate conversion into a plan view coordinate by a geometrical correction is performed in a conventional vehicle periphery viewing apparatus.
Figure 11:
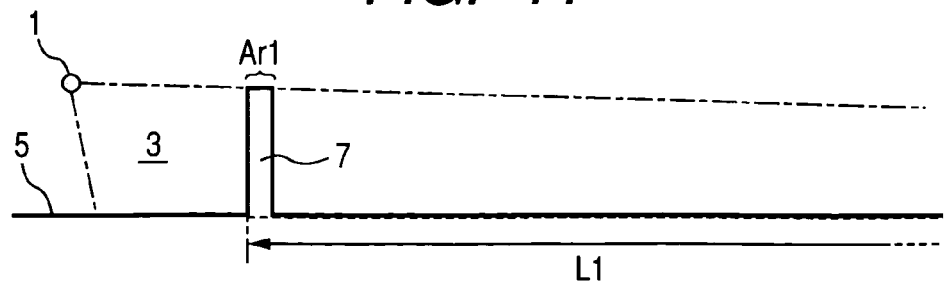
FIG. 11 is a principle diagram illustrating a problem occurring when a coordinate conversion into a plan view coordinate by a geometrical correction is performed.
Figure 12:
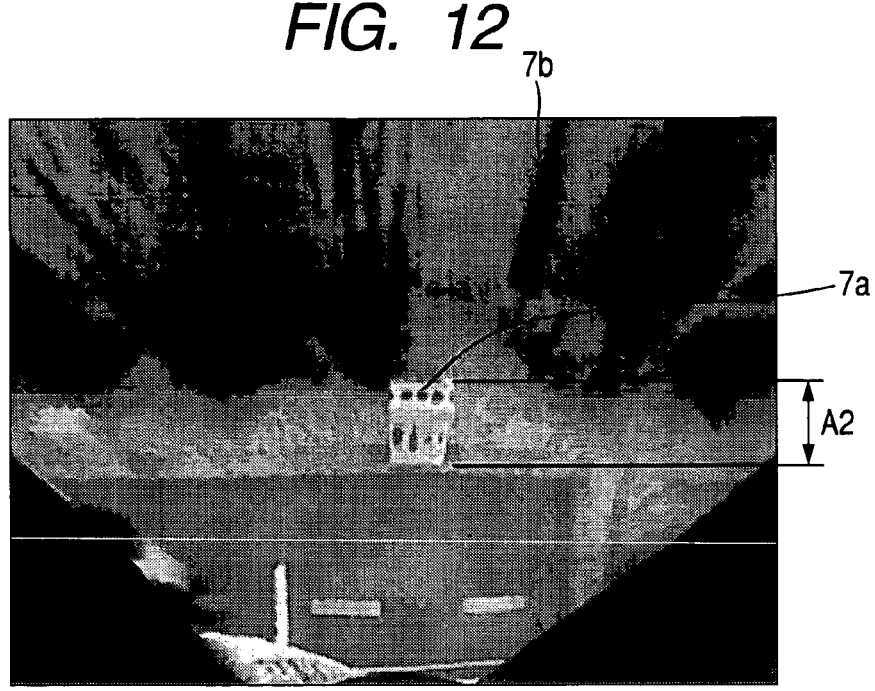
FIG. 12 is a view showing an example of image for which a coordinate conversion into a plan view coordinate by a geometrical correction is performed in a conventional vehicle periphery viewing apparatus.
Figure 13:
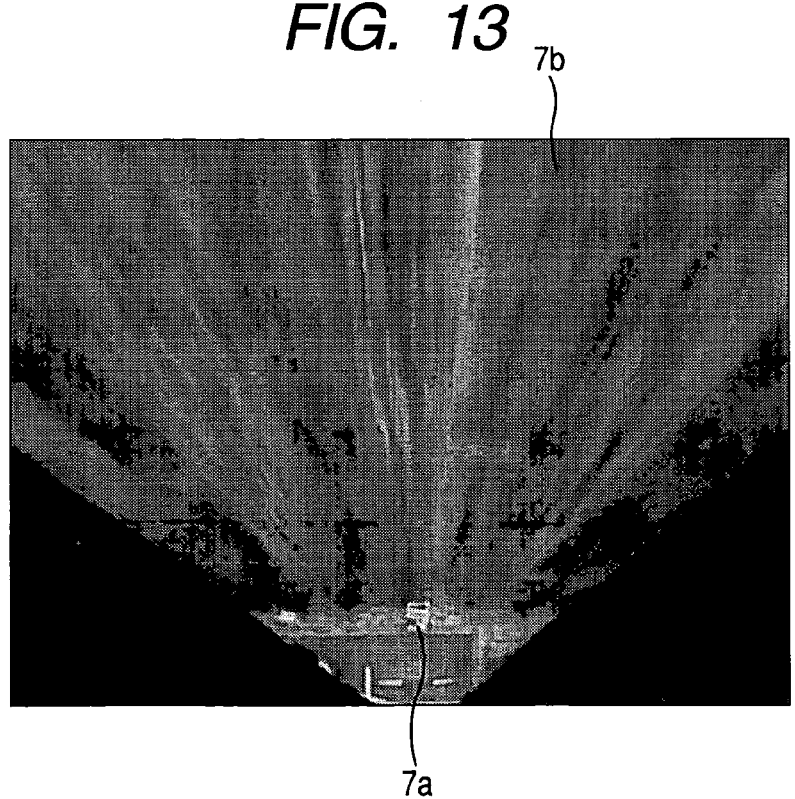
FIG. 13 is a view showing an example of image for which a coordinate conversion into a plan view coordinate by a geometrical correction is performed in a conventional vehicle periphery viewing apparatus.

At this time, as shown in FIGS. 2 and 3, since the view point conversion into the plan view coordinate by the geometrical correction is performed for the short distance image 11 while the long distance image is displayed at the point of view from which an object is obliquely seen downward, it can be prevented that the image is displayed so distorted that it is impossible to know what is imaged for the long distance image 13, as in the conventional examples (FIGS. 10 to 12) in which the view point conversion into the plan view coordinate is performed for the entire screen image. Particularly, when a wide view angle camera, for example, is used as the image capturing device such as the back camera 21, if an object having a height, which is not at ground level, is seen in the long distance image and the coordinate conversion into the plan view coordinate by the geometrical correction is performed for a captured image of the object, the image is distortedly displayed, thus increasing inconsistency due to a distorted appearance of the object. However, in this embodiment, such a distorted appearance of the object shown in the long distance image can be prevented and thus, such inconsistency can be eliminated.

In addition, in the first mode, a seam between images displayed at both upper and lower sides of the boundary 62 can be naturally displayed by performing a range adjustment in the transverse direction of the long distance image 13 such that the long distance image 13 matches the short distance image 11 separated from the boundary 62.

In addition, a switchover between modes (the first mode and the second mode) in connection with the enlargement (scale change) display of the short distance image 11 can be performed according to the vehicle conditions determined based on the information obtained from the various sensors 41. Thus, the driver (user) can display visible images in the periphery of the vehicle on the display device 15.

Particularly, in the second mode, since the enlargement (scale change) display of the short distance image 11 is performed, the sense of distance up to a different vehicle or an obstacle such as a wall shown in the short distance image 11 can be sensibly grasped in units of 10 cm or so.

In addition, in the second mode, since an image within a range of angle of view reduced by the enlargement (scale change) display of the short distance image 11 can be added to the long distance image 13 by displaying the long distance image 13 by reducing it in the vertical direction, a visible image can be displayed on the display device 15.

Further, all of the plurality of conversion tables pre-stored in the nonvolatile memory 55 is read and stored in the conversion table memory 49 and the image processing ECU 31 refers to the plurality of conversion tables stored in the conversion table 49 according to the vehicle conditions. Thus, an optimal conversion table can be applied in compliance with changes in the vehicle conditions.

Moreover, for example, the boundary 62 between the upper and lower images can be vertically moved for each mode (the first and second modes) using an operational input device of an electronic unit such as a car navigation device. Thus, when the user actually views the image shown in FIG. 2 or 3, he can freely adjust the position of the boundary 62 so that he facilitates a sensible grasp of the image. Further, a convenience can be given to the user because the adjusted position of the boundary 62 is recorded in the writable nonvolatile memory 55 and reappears initially when the vehicle periphery viewing apparatus starts next time.

Further, although the short distance image 11 displayed in a lower portion of the display device 15 and the long distance image 13 displayed in an upper portion of the display device 15 are continuously arranged in the above embodiment, an area 65 in which no image is displayed may be arranged between the lower portion and the upper portion. This allows the user to intuitively distinguish between image processes performed in the lower and upper portions and between methods of displaying the images in the lower and upper portions.

Further, although the coordinate conversion is performed for the long distance image 13 such that inconsistency does not occur at both sides of the boundary 62 between the long distance image 13 and the short distance image 11 in the above embodiment, a portion 13 of the original image shown in FIG. 1 may be displayed without change without performing any coordinate conversion. This allows easy image processing of the long distance image 13. Hence, simplification of configuration of the image processing ASIC 47 of the image processing ECU 31 or software programs to be performed in the CPU 53 of the image processing ECU 31, as well as efficient image processing of the long distance image 13.

Further, although the back camera 21 has been exemplified in the above embodiment, the same image processing may be applied to the front camera 23, the side camera 25 and other vehicle-mounted cameras 27.

What is claimed is:

1. A vehicle periphery viewing apparatus for capturing a vehicle-peripheral image, comprising:
    an image capturing device disposed on predetermined position;
    a display device disposed within the vehicle; and
    an image processing device performing an image division of the original image into a first image and a second image,
    wherein the image capturing device captures an original image from the predetermined position,
    wherein the display device displays the captured vehicle-peripheral image,
    wherein the image processing device performs a coordinate conversion into a plan view coordinate by using a geometrical correction for the first image,
    wherein the image processing device performs a predetermined image synthesis for the first image and the second image,
    wherein the image processing device displays a synthesized image on the display device,
    wherein the first image is a short distance image and the second image is a long distance image,
    wherein the predetermined image synthesis is to arrange the short distance and long distance images one above the other at a point of view from which an object is obliquely seen downward, and
    wherein the image processing device is operable to switch between a first mode for making a scale range at the boundary between the short distance image and the long distance image equal and a second mode for enlarging the short distance image.

2. The vehicle periphery viewing apparatus according to claim 1, wherein the image capturing device captures the original image from the predetermined position at a point of view from which an object is obliquely seen downward.

3. The vehicle periphery viewing apparatus according to claim 1, wherein the image processing device performs at least one of a coordinate conversion and a scale change for at least one of the short distance image and the long distance image such that no inconsistency occurs at a boundary between the arranged short and long distance images.

4. The vehicle periphery viewing apparatus according to claim 1, wherein the image processing device performs a first image processing for the short distance image to enlarge a view point conversion image of the short distance image, and
    wherein the image processing device performs a second image processing for the long distance image to include an image range which is not included in a range of angle of view by enlarging the short distance image.

5. The vehicle periphery viewing apparatus according to claim 1, wherein the short distance image is set to a range required for making the vehicle approach a target stop position from a predetermined position immediately before the vehicle stop.

6. The vehicle periphery viewing apparatus according to claim 1, wherein the image processing device performs the image synthesis after arranging an area in which an image is not displayed between the first image and the second image.

7. The vehicle periphery viewing apparatus according to claim 1, wherein the image processing device switches between the first mode and the second mode according to a vehicle condition obtained over at least one of an in-vehicle communication network and operation of an operational input device.

8. The vehicle periphery viewing apparatus according to claim 1,
    wherein the image processing device switches between the first mode and the second mode by performing a coordinate conversion using a table selected from a plurality of preset conversion tables.

9. The vehicle periphery viewing apparatus according to claim 8, wherein the image processing device switches between the first mode and the second mode by storing all conversion tables pre-stored in a nonvolatile memory in a conversion table memory, and
    wherein the image processing device performs the coordinate conversion using the selected table.

10. The vehicle periphery viewing apparatus according to claim 1, wherein the image processing device performs an image synthesis for the long distance image after enlarging or reducing the long distance image without changing the long distance image included in the original image.

11. A vehicle periphery viewing apparatus for capturing a vehicle-peripheral image, comprising:
    an image capturing device disposed on predetermined position;
    a display device disposed within the vehicle; and
    an image processing device performing an image division of the original image into a first image and a second image,
    wherein the image capturing device captures an original image from the predetermined position,
    wherein the display device displays the captured vehicle-peripheral image,
    wherein the image processing device performs a coordinate conversion into a plan view coordinate by using a geometrical correction for the first image,
    wherein the image processing device performs a predetermined image synthesis for the first image and the second image,
    wherein the image processing device displays a synthesized image on the display device,
    wherein the first image is a short distance image and the second image is a long distance image,
    wherein the predetermined image synthesis is to arrange the short distance and long distance images one above the other at a point of view from which an object is obliquely seen downward, and
    wherein the image processing device performs an image synthesis for the long distance image after enlarging or reducing the long distance image without changing the long distance image included in the original image.

* * * * *